(No Model.)
L. J. B. EASTON.
FLAXSEED SEPARATING MACHINE.
No. 422,748. Patented Mar. 4, 1890.
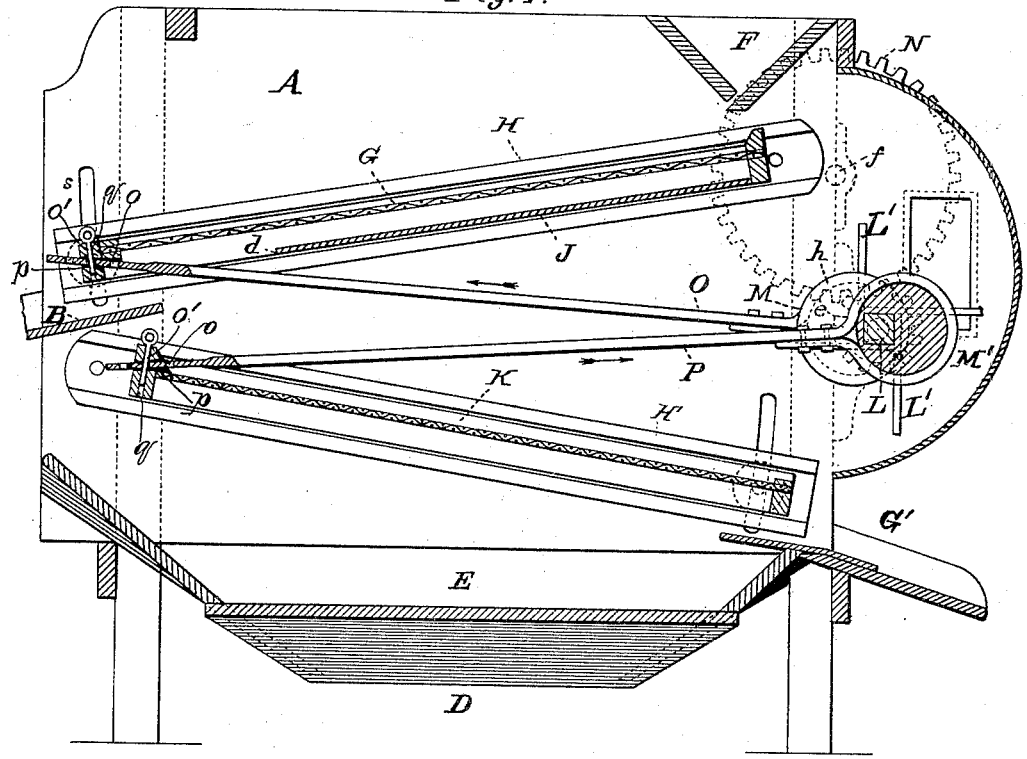
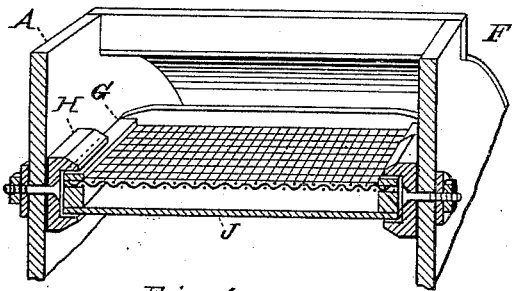
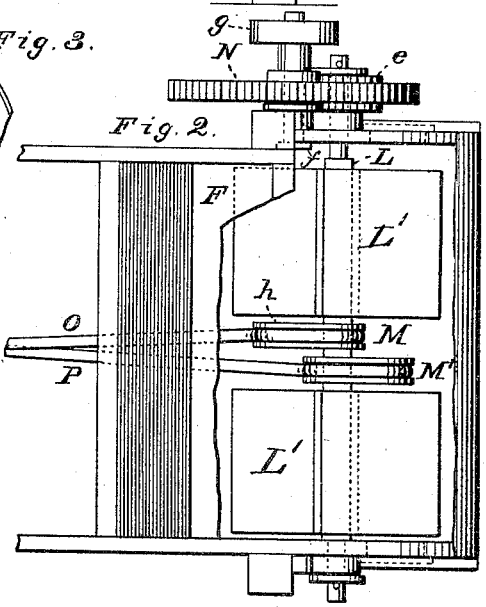
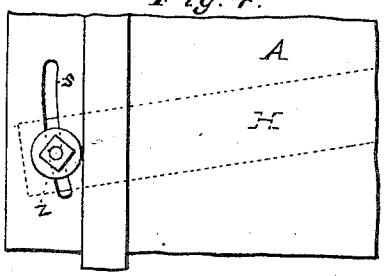
WITNESSES
Villette Anderson,
Mary Boykin
INVENTOR
Lucy J. B. Easton
by E. W. Anderson,
Attorney

UNITED STATES PATENT OFFICE.

LUCY J. B. EASTON, OF ROCHESTER, MINNESOTA.

FLAXSEED-SEPARATING MACHINE.

SPECIFICATION forming part of Letters Patent No. 422,748, dated March 4, 1890.

Application filed March 26, 1889. Serial No. 304,807. (No model.)

*To all whom it may concern:*

Be it known that I, LUCY J. B. EASTON, a citizen of the United States, and a resident of Rochester, in the county of Olmsted and State of Minnesota, have invented certain new and useful Improvements in Flaxseed-Separating Machines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of this invention and is a vertical section taken lengthwise. Fig. 2 is a detail and top view. Fig. 3 is a detail and perspective section. Fig. 4 is a detail.

This invention relates to improvements in cleaning-machines for flaxseed and other seed; and it consists in the construction and novel combination of parts, as hereinafter set forth and claimed. In machines heretofore made for this purpose the screens are arranged to move laterally and the seed fall directly from the upper sieve to the lower ones, which is objectionable, as the seed are not thoroughly cleaned. In my machine the sieves are reciprocated longitudinally and are traversed the whole length by the seed falling upon them, thus obtaining a complete separation of the smaller from the larger seed and of the dirt therefrom.

Referring to the drawings, A designates the casing, consisting of the corner-posts and the side and end walls, having an opening or chute B at one end for the escape of buckwheat or other coarse seed and an opening G' on a lower level at the opposite end for the escape of the cleaned flaxseed or other seed. The bottom D converges downward from its ends to the center, where it is provided with the opening E, through which dirt and other substances which fall through the lower sieve pass.

F is a hopper secured to the top of the casing, which conveys the seed to the upper or higher end of the sieve G, which moves endwise in a grooved frame H, which is attached at its upper end pivotally to the outer sides of the machine and at its lower end is provided with thumb-screws Z, working through slots S in the sides of the machine, serving to vary the pitch of frame H and its inclosed sieve G at the lower end. The sieve G reciprocates longitudinally in this case, with the lower sieve K fixed in a similar grooved frame H' and reciprocating longitudinally with reference to sieve G.

J is a close bottom attached to the frame below the upper sieve G. The bottom J is shorter than the sieve and terminates at the point d of the frame, so that the seed falling thereon will be conveyed to the upper end of the sieve K, which is of smaller mesh than the sieve G and is similarly incased, but having its pitch in the opposite direction, as shown.

A shaft L, carrying fans L' and having bearings in the end posts, is provided centrally and intermediately of the fans with the eccentrics M M' and at one end with a pinion e, engaging with a gear-wheel N, journaled on a pin f, extending from the casing, and a crank or pulley g is provided on said gear-wheel.

O is a rod connecting by means of the ring h with the eccentric M, and having its opposite end pivotally attached to the lower end of the sieve which works in the grooved frame H, and P is a rod having similar connection for operating the lower sieve. The rods O and P are each provided near one end with a series of apertures o, which are engaged by an adjusting eye-pin o', said ends of said rods passing through oblique openings p in the outer end pieces of the sieves G and K, and the said pins passing through apertures q, extending through said end pieces transversely of said openings p. This arrangement permits of the relative adjustment of the sieves to each other and to the fans L' L', according to the amount of blast to which it is desired to subject the sieves.

It will be observed that the eccentrics M M' are secured on the shaft in opposite positions, so that by rotating said shaft the sieves are operated in opposite directions to each other.

Having described my invention, what I claim, and desire to secure by Letters Patent, is—

The flaxseed-separating machine consisting of the closure or casing, the upper and lower oppositely-inclined pivoted frames supported in said closure or casing, the screens carried by said frames, the fans and their common shaft having intermediately of the fans oppositely-arranged eccentrics, the rods loosely embracing said eccentrics at one end and each having at the opposite end a series of apertures and passing through an aperture in the outer end piece of each sieve, and the adjusting-pins passing through other apertures in said end pieces of the sieves and engaging the series of apertures in said rods, substantially as set forth.

In testimony whereof I affix my signature in presence of two witnesses.

LUCY J. B. EASTON.

Witnesses:
H. A. ECKHOLDT,
LEON LILLIE.